United States Patent

Yamaguchi

(10) Patent No.: US 9,291,473 B2
(45) Date of Patent: Mar. 22, 2016

(54) NAVIGATION DEVICE

(71) Applicant: Yoshihisa Yamaguchi, Chiyoda-ku (JP)

(72) Inventor: Yoshihisa Yamaguchi, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 15 days.

(21) Appl. No.: 14/383,374

(22) PCT Filed: Dec. 4, 2012

(86) PCT No.: PCT/JP2012/081351
§ 371 (c)(1),
(2) Date: Sep. 5, 2014

(87) PCT Pub. No.: WO2013/132712
PCT Pub. Date: Sep. 12, 2013

(65) Prior Publication Data
US 2015/0032364 A1   Jan. 29, 2015

(30) Foreign Application Priority Data

Mar. 7, 2012   (JP) .................................. 2012-050478

(51) Int. Cl.
*G10L 21/00* (2013.01)
*G06F 7/00* (2006.01)
(Continued)

(52) U.S. Cl.
CPC ............ *G01C 21/3629* (2013.01); *G06F 3/167* (2013.01); *G06F 17/30749* (2013.01); *G10L 13/027* (2013.01)

(58) Field of Classification Search
USPC ......... 701/400, 409, 419, 428, 431, 433, 435, 701/441, 43, 526, 532, 408, 430; 704/274, 704/275; 707/758, 769; 711/165
See application file for complete search history.

(56) References Cited

U.S. PATENT DOCUMENTS

| | | | | |
|---|---|---|---|---|
| 2002/0035474 A1* | 3/2002 | Alpdemir | ............... | G06Q 30/02 704/270 |
| 2003/0125958 A1* | 7/2003 | Alpdemir | ............... | G10L 15/26 704/275 |

(Continued)

FOREIGN PATENT DOCUMENTS

| | | |
|---|---|---|
| JP | 02 83600 | 6/1990 |
| JP | 2002 277271 | 9/2002 |

(Continued)

OTHER PUBLICATIONS

International Search Report issued on Mar. 5, 2013 in PCT/JP12/081351, filed Dec. 4, 2012.

*Primary Examiner* — Ronnie Mancho
(74) *Attorney, Agent, or Firm* — Oblon, McClelland, Maier & Neustadt, L.L.P.

(57) ABSTRACT

A navigation includes a next audio output state storage that stores, as a next audio output, an audio output which is started the next time when one audio output is completed, a next audio output state determiner that determines whether or not to output the next audio output on the basis of both the storing state of the next audio output and current navigation information, and an output determiner that, when a plurality of playback requests coincide, outputs an audio output having a higher one of priorities acquired from the priority holder, and stores an audio output having a lower one of the priorities in the next audio output state storage as a next audio output, and that determines an audio output to be played back according to the determination by the next audio output state determiner when one audio output is completed.

8 Claims, 7 Drawing Sheets

(51) Int. Cl.
*G06F 17/30* (2006.01)
*G01C 21/36* (2006.01)
*G10L 13/027* (2013.01)
*G06F 3/16* (2006.01)

(56) References Cited

U.S. PATENT DOCUMENTS

| | | | | |
|---|---|---|---|---|
| 2004/0006478 | A1* | 1/2004 | Alpdemir | G06Q 30/02 704/275 |
| 2005/0143915 | A1 | 6/2005 | Odagawa et al. | |
| 2005/0276570 | A1* | 12/2005 | Reed, Jr. | G06F 17/30038 386/231 |
| 2008/0120342 | A1* | 5/2008 | Reed | G06F 17/30017 |
| 2009/0029670 | A1* | 1/2009 | Cho, II | G01C 21/00 455/344 |
| 2009/0044073 | A1* | 2/2009 | Cho, II | H03M 13/2721 714/758 |
| 2010/0191608 | A1* | 7/2010 | Mikkelsen | G06Q 30/0601 705/26.1 |
| 2010/0220037 | A1* | 9/2010 | Sako | A63F 13/12 345/8 |
| 2011/0225417 | A1* | 9/2011 | Maharajh | G06F 21/10 713/150 |
| 2012/0036220 | A1* | 2/2012 | Dare | G06F 8/61 709/217 |
| 2012/0036440 | A1* | 2/2012 | Dare | G06F 9/4445 715/734 |
| 2012/0069131 | A1* | 3/2012 | Abelow | G06Q 10/067 348/14.01 |
| 2012/0110616 | A1* | 5/2012 | Kilar | H04N 7/17318 725/32 |
| 2013/0173879 | A1* | 7/2013 | Suzuki | G06F 12/02 711/165 |
| 2013/0311036 | A1* | 11/2013 | Liu | G06Q 30/0241 701/36 |
| 2013/0325478 | A1* | 12/2013 | Matsumoto | B60W 50/08 704/274 |
| 2013/0334300 | A1* | 12/2013 | Evans | G06F 17/30017 235/375 |
| 2014/0006951 | A1* | 1/2014 | Hunter | H04H 60/31 715/719 |
| 2014/0073236 | A1* | 3/2014 | Iyer | H04H 60/31 455/2.01 |
| 2014/0073276 | A1* | 3/2014 | Iyer | H03J 1/0008 455/179.1 |
| 2014/0193047 | A1* | 7/2014 | Grosz | G06F 3/1242 382/118 |
| 2014/0195921 | A1* | 7/2014 | Grosz | G06F 3/1242 715/738 |
| 2015/0032364 | A1* | 1/2015 | Yamaguchi | G01C 21/3629 701/400 |

FOREIGN PATENT DOCUMENTS

| | | |
|---|---|---|
| JP | 2005 172450 | 6/2005 |
| JP | 2006 107136 | 4/2006 |
| JP | 2009 294310 | 12/2009 |
| JP | 2010 112762 | 5/2010 |
| JP | 4700904 | 6/2011 |

* cited by examiner

FIG.2

|  | Audio Output Which Has Been Played Back Originally | | | | |
|---|---|---|---|---|---|
|  | Audio Output A | Audio Output B | Audio Output C | Audio Output D | ... |
| Audio Output A | — | New-Mem | New-No | New-Mem | |
| Audio Output B | Old-Mem | — | New-No | New-Mem | |
| Audio Output C | Old-No | New-Mem | — | Same-No | |
| Audio Output D | Old-Mem | Old-Mem | Same-No | — | |
| ... | | | | | |

(first column group label: "Audio Output Which Is to Be Played Back Newly")

[Left-Hand Side Symbol]
Old : Giving Higher Priority to Old Audio Output (Which Has Been Played Back Originally)
New: Giving Higher Priority to New Audio Output
Same: Same Priority

[Right-Hand Side Symbol]
Mem: Store in Next Audio State Storage
No : Don't Store in Next Audio State Storage

FIG.3

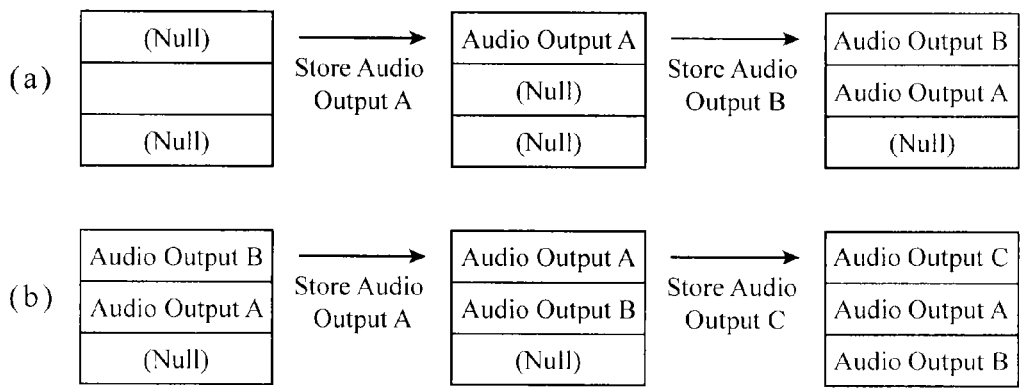

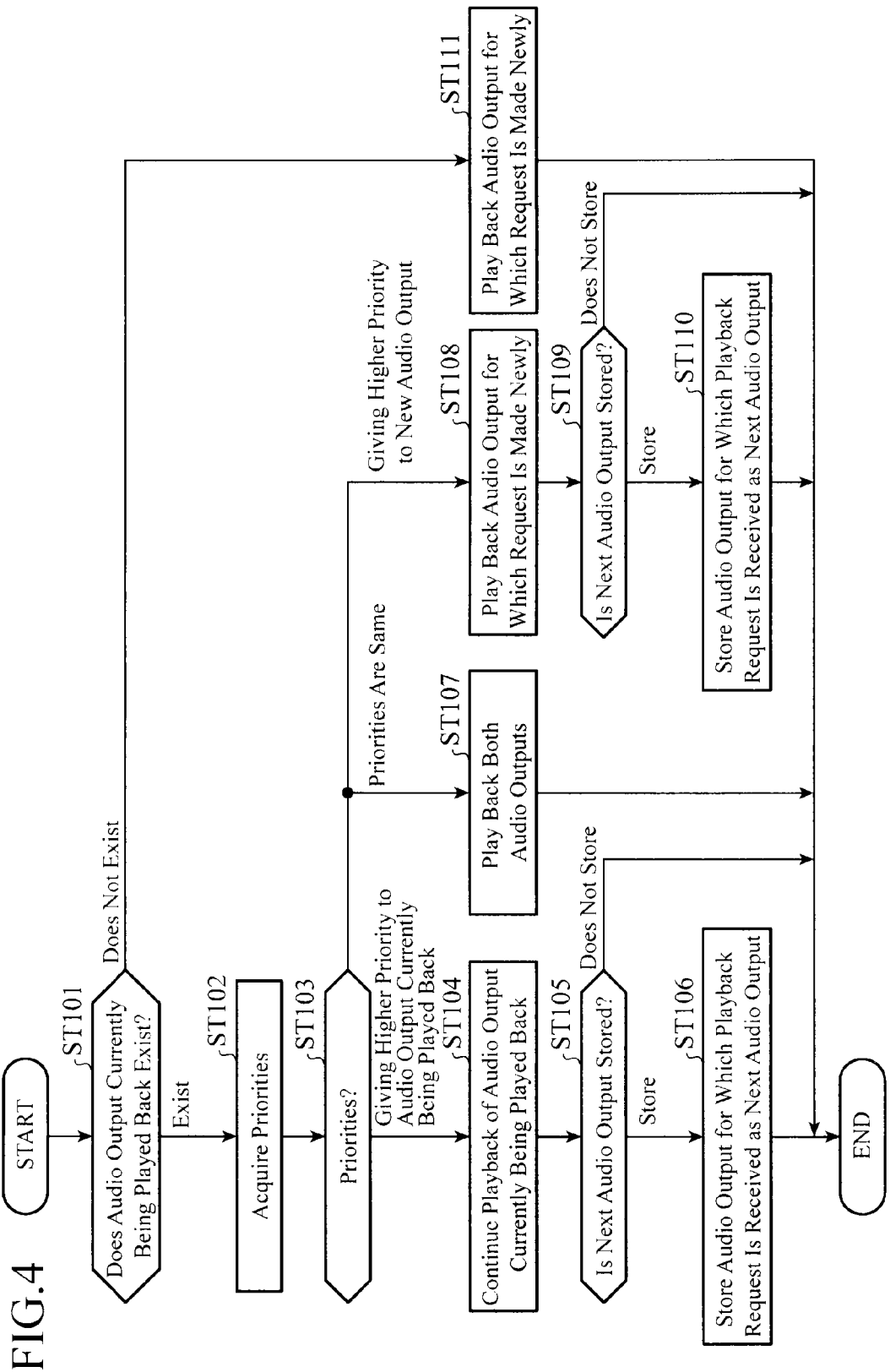

NAVIGATION DEVICE

FIELD OF THE INVENTION

The present invention relates to a navigation device that guides the user to his or her destination. More particularly, it relates to a technique of controlling a playback of music and output of a guiding voice.

BACKGROUND OF THE INVENTION

A conventional car navigation device includes a function of playing back music recorded in a CD (Compact Disc) or the like in many cases. Further, many car navigation devices have a function of outputting, by voice, information including information about a route to a destination, traffic information, and information showing an approach to a recommended spot, a registered point, or an attention point (each information outputted by the navigation devices, other than music, is generically referred to as "guidance information" from here on).

A problem with a car navigation device having both these functions is that when output of guidance information by voice is performed simultaneously with a playback of music, the two sounds coincide. Audio information, such as guidance information or music which a navigation device outputs, is generically referred to as an "audio output."

In order to solve this problem, patent reference 1 discloses a technique of providing road traffic information during an interlude portion of a musical piece. In more detail, guidance information is played back during an interlude of a musical piece (a portion other than vocals), and, at a time when a vocal part is played back after returning to the musical piece, a return to the beginning of the vocal part is performed and this part is played back.

Further, patent reference 2 discloses a technique of controlling the playback of pieces of music by predicting a point which traffic information will be received in advance, and then changing the order of the playback list in such a way that pieces of music are completed until then.

RELATED ART DOCUMENT

Patent Reference

Patent reference 1: Japanese Unexamined Patent Application Publication No. 2005-172450
Patent reference 2: Japanese Unexamined Patent Application Publication No. 2010-112762

SUMMARY OF THE INVENTION

Problems to be Solved by the Invention

By the way, although a method of outputting music and guidance information simultaneously is taken into consideration in the techniques disclosed by the related art documents, a case in which three or more audio outputs coincide is not taken into consideration. For example, an output method at a time when route guidance, guidance of traffic information, and music coincide is not taken into consideration. Particularly, no consideration is given to a process which should be performed after one audio output is completed. As a process which should be performed after one audio output is completed, there can be considered a process (1) of returning to the playback state of the originally played music after the remaining guidance information is sequentially outputted one at a time, and a process (2) of returning to the playback state of the originally played music without performing output of the remaining guidance information. Although it is necessary to make these processes differ according to the types of pieces of guidance information which are outputted simultaneously, this point is not taken into consideration in the techniques disclosed by the related art documents.

Further, in the techniques disclosed by the related art documents, no consideration is given to cases in which when audio outputs coincide, it takes much time to process the audio output previously outputted and, when outputting the remaining audio output, the information is no longer necessary. For example, no consideration is given to a case in which the postponed audio output becomes unnecessary due to a passage of time, a movement of the vehicle, or the like.

The present invention is made in order to solve the above-mentioned problems, and it is therefore an object of the present invention to provide a navigation device that even though a plurality of audio outputs coincide, can manage the priority of each audio output and control a playback of the audio output in such a way as not to perform any unnecessary audio output.

Means for Solving the Problem

In order to solve the above-mentioned problem, in accordance with the present invention, there is provided a navigation device including: a next audio output state storage that stores, as a next audio output, an audio output which is started next time when one audio output is completed; a priority database that holds priorities between the audio outputs and information showing whether or not to store the audio output having a lower one of the priorities in the next audio output state storage; a priority holder that acquires and manages the priorities of the audio outputs from the priority database; a next audio output state determiner that determines whether or not to output the next audio output stored in the above-mentioned next audio output state storage on the basis of both a storing state of the next audio output in the next audio output state storage, and current navigation information; and an output determiner that, when a plurality of playback requests each for playback of the audio output coincide, outputs the audio output having a highest one of the priorities acquired from the priority holder, and stores the audio output having a lower one of the priorities other than the audio output having the highest one of the priorities in the next audio output state storage as the next audio output, and that determines the audio output to be played back according to the determination by the next audio output state determiner when the one audio output is completed.

Advantages of the Invention

According to the present invention, there is provided a navigation device that even though a plurality of audio outputs coincide, can manage the priority of each audio output and control a playback of the audio output in such a way as not to perform any unnecessary audio output.

BRIEF DESCRIPTION OF THE FIGURES

FIG. 2 is a view showing an example of a priority database of the navigation device in accordance with Embodiment 1 of the present invention;

FIG. 3 is a view for explaining next audio outputs stored in a next audio output state storage of the navigation device in accordance with Embodiment 1 of the present invention;

FIG. 4 is a flow chart showing a process which implements a first function of an output determiner of the navigation device in accordance with Embodiment 1 of the present invention;

EMBODIMENTS OF THE INVENTION

Hereafter, the preferred embodiments of the present invention will be explained in detail with reference to the drawings.

Embodiment 1

Figure 1:
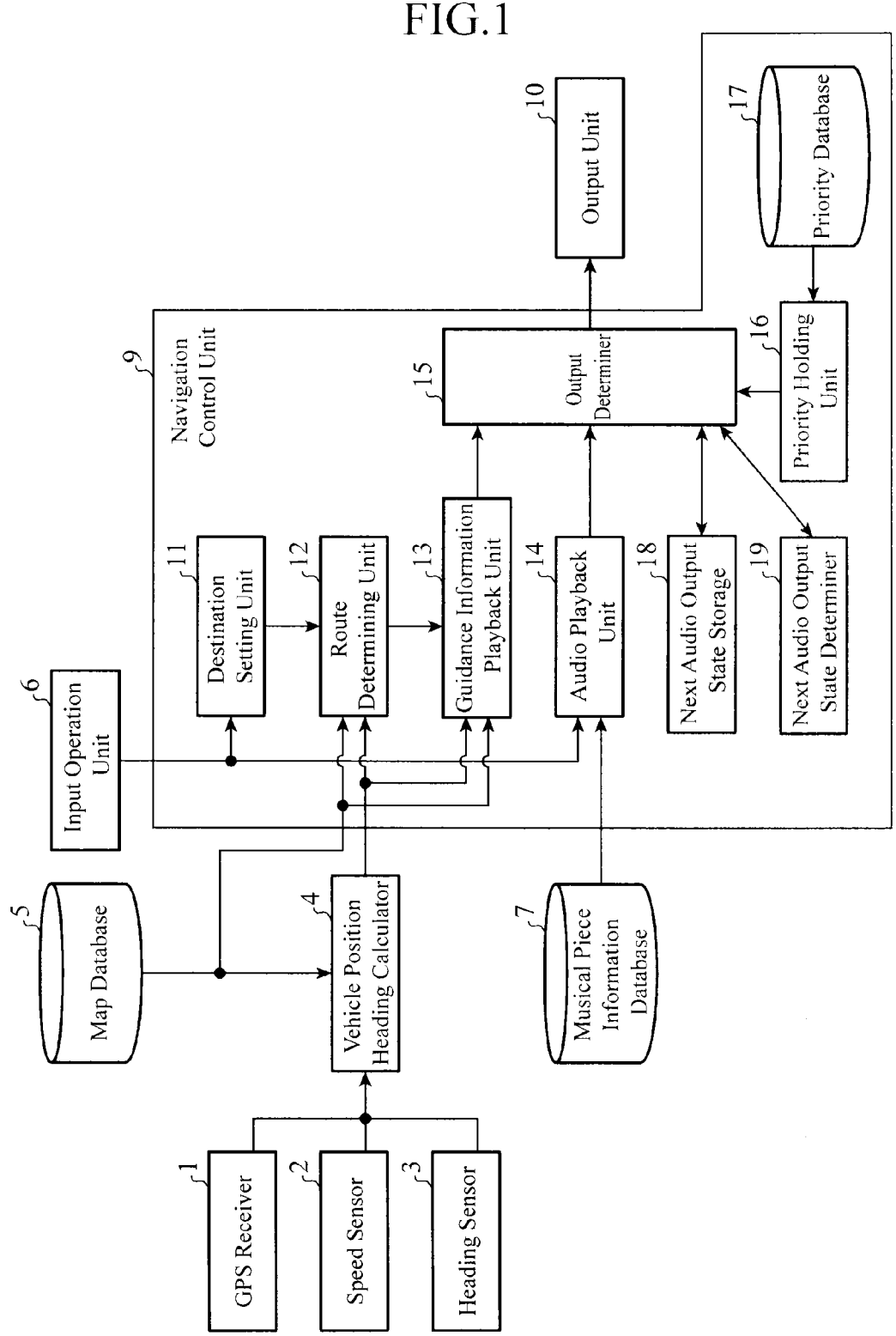
FIG. 1 is a block diagram showing the structure of a navigation device in accordance with Embodiment 1 of the present invention.

FIG. 1 is a block diagram showing the structure of a navigation device in accordance with Embodiment 1 of the present invention. Hereafter, an explanation will be made by taking, as an example of the navigation device, a car navigation device mounted in a vehicle. Further, in Embodiment 1, a case in which a next audio output state storage unit 18 (details will be mentioned later) stores only an audio output which will start being outputted the next time will be explained.

The navigation device includes a GPS (Global Positioning System) receiver 1, a speed sensor 2, a heading sensor 3, a vehicle position heading calculator 4, a map database 5, an input operation unit 6, a musical piece information database 7, a navigation control unit 9, and an output unit 10. To avoid the drawing from becoming complicated, a part of lines (lines each showing a flow of a signal or data) each of which connects between blocks is omitted.

The GPS receiver 1 measures a vehicle position by receiving radio waves from a plurality of GPS satellites. The vehicle position measured by this GPS receiver 1 is sent to the vehicle position heading calculator 4 as a vehicle position signal.

The speed sensor 2 measures the speed of the vehicle successively. This speed sensor 2 is typically comprised of a sensor for measuring the rotation frequency of a tire. The speed of the vehicle measured by the speed sensor 2 is sent to the vehicle position heading calculator 4 as a vehicle speed signal.

The heading sensor 3 measures the traveling direction of the vehicle successively. The traveling direction (referred to as the "heading" from here on) of the vehicle measured by this heading sensor 3 is sent to the vehicle position heading calculator 4 as a heading signal.

The vehicle position heading calculator 4 measures the current position and the heading of the vehicle from the vehicle position signal sent thereto from the GPS receiver 1. When the vehicle has an obstructed view of the sky above itself because of the inside wall of a tunnel, surrounding buildings, or the like, the number of GPS satellites from which radio waves can be received becomes zero or decreases and hence the reception state gets worse, and the car navigation device enters a state in which the car navigation device becomes impossible to measure the current position and the heading of the vehicle only by using the vehicle position signal from the GPS receiver 1, or a state in which the car navigation device can measure the current position and the heading, but the accuracy gets worse. In such a case, the car navigation device performs a process of measuring the vehicle position by using dead reckoning using the vehicle speed signal from the speed sensor 2 and the heading signal from the heading sensor 3 to compensate for the measurement by the GPS receiver 1.

The current position and the heading of the vehicle which are measured by the vehicle position heading calculator 4 include various errors such as deterioration in the measurement accuracy caused by deterioration in the reception state of the GPS receiver 1, a change in the diameter of the tire caused by tire wear, and an error in the vehicle speed resulting from a temperature change or an error resulting from the accuracy of each sensor itself. Therefore, the vehicle position heading calculator 4 corrects the current position and the heading of the vehicle acquired through the measurement and including errors by performing map matching using road data acquired from map data read from the map database 5. These corrected current position and heading of the vehicle are sent to the navigation control unit 9 as vehicle position and heading data.

The map database 5 stores the positions of roads, the types of the roads (highway, toll road, local street, or minor street), information about roads each holding road data, such as restrictions on the road (speed limits, one-way traffic restrictions, and so on) or lane information in the vicinity of each intersection, position information about guidance objects, and information about the guidance objects, such as their names and their genres. The position of a road is expressed by showing the road with a plurality of nodes and links connecting among the nodes using straight lines, and then recording the latitudes and the longitudes of these nodes. For example, a case in which three or more links are connected to anode shows that a plurality of roads intersect at the position of the node. While any content held by this map database 5 is read by the vehicle position heading calculator 4, as mentioned above, any content is ready by the navigation control unit 9.

The input operation unit 6 is comprised of at least one of a remote controller, a touch panel, a voice recognition device, and so on, and is used in order for the driver or a fellow passenger who is a user to input his or her destination or to select information which the navigation device provides by performing an operation. Data generated through an operation on this input operation unit 6 is sent to the navigation control unit 9 as operation data.

The musical piece information database 7 stores pieces of musical piece information each of which consists of data in which music is described. Musical piece information stored in this musical piece information database 7 is read by an audio playback unit 14 of the navigation control unit 9. As the musical piece information database 7, a storage medium which the user inserts into the navigation device, such as a CD, an SD (Secure Digital Memory), or a USB (Universal Serial Bus) memory, an HDD (Hard Disk Drive) mounted in the navigation device in which pieces of musical piece information read from the above-mentioned storage medium are stored, a storage which can acquire pieces of musical piece information by way of the Internet or the like and which exists outside the navigation device, or the like can be used. Further, as musical piece information, not only information stored in a storage medium, such as a CD, but also stream information, such as radio stream information, can be used.

The navigation control unit 9 has one or more of the following functions:

(1) determination of a guidance route to the destination inputted from the input operation unit 6;

(2) generation of guidance information according to the guidance route and the current position and the heading of the vehicle;

(3) a function of displaying a map of an area surrounding the vehicle, such as generation of a guide map in which a vehicle mark showing the vehicle position is superimposed on a map of an area surrounding the vehicle position;

(4) a data process for providing a function for guiding the vehicle to the destination, and so on;

(5) traffic information associated with the vehicle position, the destination, or the guidance route;

(6) a search for information about a sightseeing area, a restaurant, or a retail store; and (7) a data process, such as a search for facilities matching a condition inputted from the input operation unit 6.

Further, the navigation control unit 9 has at least one of the following functions:

(8) a function of guiding the vehicle to the destination by using audio information;

(9) a function of acquiring congestion information about an area surrounding the vehicle or the route, or information about hazardous points from a database that stores them in advance or from outside the navigation device via an antenna or the Internet to provide guidance by voice; and

(10) a function of playing back musical piece information on the radio or recorded in a CD, an SD, or the like. The details of this navigation control unit 9 will be mentioned below.

The output unit 10 consists of, for example, an LCD (Liquid Crystal Display), and displays a map, an operation menu, etc. on the screen according to display data sent thereto from the navigation control unit 9. Further, the output unit outputs music or route guidance from the speaker according to the guidance information or the audio information sent thereto from the navigation control unit 9.

Next, the details of the navigation control unit 9 will be explained. The navigation control unit 9 includes a destination setting unit 11, a route determining unit 12, a guidance information playback unit 13, the audio playback unit 14, an output determiner 15, a priority holding unit 16, a priority database 17, a next audio output state storage 18, and a next audio output state determiner 19.

The destination setting unit 11 sets a destination according to the operation data sent thereto from the input operation unit 6. The destination set by this destination setting unit 11 is sent to the route determining unit 12 as destination data.

The route determining unit 12 determines a guidance route to the destination by using the destination data sent thereto from the destination setting unit 11, the vehicle position and heading data sent thereto from the vehicle position heading calculator 4, and the map data read from the map database 5. The guidance route determined by this route determining unit 12 is sent to the guidance information playback unit 13 as guidance route data.

The guidance information playback unit 13 plays back the guidance information by using the guidance route data sent thereto from the route determining unit 12 and the map data read from the map database 5. The guidance information includes information about route guidance to the destination, information about surrounding facilities at the current position or on the route, congestion or traffic information acquired from outside the car navigation device. The guidance information played back by the guidance information playback unit 13 is sent to the output determiner 15.

The audio playback unit 14 plays back a musical piece on the basis of the operation data sent thereto from the input operation unit 6 and the musical piece information read from the musical piece information database 7. The piece of music played back by this audio playback unit 14 is sent to the output determiner 15 as audio information.

The priority holding unit 16 manages priorities between the guidance information and the audio information, in other words, priorities between the audio outputs with reference to the priority database 17. The priority database 17 stores at least the priorities between the audio outputs. The priority database 17 can include information showing whether or not to store a low-priority audio output as a next audio output. FIG. 2 shows an example of the priority database 17 including the priorities and the information showing whether or not to store a low-priority audio output as a next audio output. In the example of FIG. 2, the highest priority is always given to an audio output A, priorities are given to audio outputs B and C in such a way that a higher priority is given to an audio output which will be played back after the other audio output is played back, and the same priority is given to audio outputs C and D.

In the example shown in FIG. 2, although the priorities including only the same audio output (−), first-come first-served (Old) giving a higher priority to an old audio output (which has been played back originally), last-come first-served (New) giving a higher priority to a new audio output, and the same (Same) priority exist, a priority according to a playback duration, such as giving a higher priority to an audio output having a short playback duration, can also be used. In this case, a still more detailed behavior can be set up.

By providing the priorities and the information showing whether or not to store a low-priority audio output as a next audio output in this way, it becomes unnecessary to store, as a next audio output, an audio output which is useless unless it is played back promptly. As a result, the navigation device does not perform unnecessary audio output. For example, the following conditions are assumed.

Audio output 1: route guidance
Audio output 2: incoming phone call
Priorities: incoming phone call>route guidance In this case, considering a case in which an incoming phone call occurs during route guidance, the navigation device operates in the following manner. More specifically, because the priority of the incoming phone call is high, the incoming phone call is selected as the audio output, and the route guidance is stored as a next audio output.

After the incoming phone call is ended, the navigation device returns to the route guidance which is stored as a next audio output.

Further, the priority database 17 does not necessarily need to exist inside the navigation device. For example, the priority database 17 can be structured in such a way as to exist in a server disposed outside the navigation device, and acquire data from the server via the Internet.

The next audio output state storage 18 stores a next audio output in response to a playback request from the output determiner 15. Further, when receiving an inquiry about a next audio output from the output determiner 15, the next audio output state storage 18 returns data showing the next audio output stored therein. According to the simplest method, next audio outputs are stored in the order that requests for the audio outputs are received, as shown in FIG. 3(a).

Further, when newly storing the same next audio output as an already-stored next audio output, the next audio output state storage 18 can delete the already-stored next audio output and store the next audio output while avoiding the redundancy, as shown in FIG. 3(b).

Further, the next audio output state storage 18 can store, as a next audio output, not only the type of an audio output, but also the contents of the audio output, the position at which to start a playback (e.g., the position corresponding to a lapse of 10 seconds after the beginning of a second piece of music of a CD), or the like.

On the basis of the storing state of a next audio output acquired from the next audio output state storage 18 via the output determiner 15, and current navigation information (in greater detail, by making a comparison between the next audio output and the current navigation information), the next audio output state determiner 19 determines whether or not to output the audio output stored in the next audio output state storage 18. Information showing a result of the determination by this next audio output state determiner 19 is acquired by the output determiner 15. As the current navigation information, information which can be acquired by the navigation device when determining whether or not to output the audio output can be used.

The output determiner 15 has two functions roughly divided. The first function is the one of receiving the guidance information sent thereto from the guidance information playback unit 13 and the audio information sent thereto from the audio playback unit 14, and determining which one of them is to be played as an audio output. The second function is the one of, when a playback of one audio output is completed, returning to the audio output which has been played back previously before the playback.

A process for implementing the first function will be explained with reference to a flow chart shown in FIG. 4. Hereafter, an explanation will be made by assuming that the audio output currently being played back is the one A, and the audio output for which a playback request has been newly made is the one B. When receiving a playback request from the guidance information playback unit 13 or the audio playback unit 14, the output determiner 15 starts the process.

When the process is started, it is checked first whether an audio output currently being played back exists (step ST101). More specifically, the output determiner 15 checks whether or not a playback of an audio output is currently being performed. When it is determined in this step ST101 that an audio output currently being played back exists, for example, the audio output A is currently being played back, priorities are then acquired (step ST102). More specifically, the output determiner 15 acquires the priority of the audio output A and that of the audio output B from the priority holding unit 16.

The priorities are then checked (step ST103). More specifically, the output determiner 15 refers to the priorities acquired from the priority holding unit 16 to check whether a higher priority is given to the audio output A currently being played back, the same priority is given to the audio outputs, or a higher priority is given to the new audio output B.

When it is determined in this step ST103 that a higher priority is given to the audio output currently being played back, the playback of the audio output currently being played back is continued (step ST104). More specifically, the output determiner 15 continues the playback of the audio output A which has been played back originally.

It is then checked whether or not to store a next audio output (step ST105). More specifically, the output determiner 15 checks the data acquired in step ST102 to determine whether or not to store a next audio output.

When it is determined in this step ST105 that a next audio output is stored, the audio output for which the playback request has been received is stored as the next audio output (step ST106). More specifically, the output determiner 15 stores the audio output B in the next audio output state storage 18 as the next audio output. After that, the process is ended. In contrast, when it is determined in step ST105 that no next audio output is stored, the process of step ST106 is skipped and the process is ended.

When it is determined in above-mentioned step ST103 that the priorities are the same, both the audio outputs are played back (step ST107). More specifically, because the audio output A has the same priority as the audio output B, the output determiner 15 mixes the audio output A and the audio output B and plays back them simultaneously. After that, the process is ended.

When it is determined in above-mentioned step ST103 that a higher priority is given to the new audio output, the audio output for which the request has been newly made is then played back (step ST108). More specifically, the output determiner 15 stops the playback of the audio output A which has been played back originally, and plays back the audio output B for which the request has been newly made.

It is then checked whether or not to store a next audio output (step ST109). More specifically, the output determiner 15 checks the data acquired in step ST102 to determine whether or not to store a next audio output.

When it is determined in this step ST109 that a next audio output is stored, the audio output which has been played back originally is stored as the next audio output (step ST110). More specifically, the output determiner 15 stores the audio output A in the next audio output state storage 18 as the next audio output. After that, the process is ended. In contrast, when it is determined in step ST105 that no next audio output is stored, the process of step ST110 is skipped and the process is ended.

When it is determined in above-mentioned step ST101 that no audio output is currently being played back, that is, the audio output A does not exist, the audio output for which the request has been newly made is then played back (step ST111). More specifically, the output determiner 15 plays back the audio output B for which the request has been newly made. After that, the process is ended.

Although the navigation device is structured in such a way as to, when it is determined in above-mentioned step ST103 that the priorities of the audio outputs A and B are the same, play back the audio outputs A and B simultaneously in step ST107, the playback method at the time when the priorities are the same can be a method other than the simultaneously playback method. The behavior can also be changed according to the playback order, the playback duration, or a system setting. For example, the behavior can be changed according to the following method: "giving a higher priority to the audio output currently being played back", "giving a higher priority to the audio output for which a request has been newly made", "giving a priority to an audio output whose playback is completed in a short time", or "according to the order which is set up in advance by a system developer or a user."

Further, even in the case of simultaneously playback, the playback method of playing back the audio output can be changed according to the playback order or a system setting. For example, the volume of the audio output currently being played back is increased.

Next, a process for implementing the second function will be explained with reference to a flow chart shown in FIG. 5. Hereafter, the function of, when the playback of one audio output is completed, returning to the audio output which has been played back previously will be explained.

When the process is started, the next audio output is acquired first (step ST201). More specifically, the output determiner 15 tries to acquire the next audio output from the next audio output state storage 18. It is then checked whether or not the next audio output exists (step ST202). More specifically, the output determiner 15 checks whether or not it has succeeded in acquiring the next audio output in step ST201, in other words, whether or not the next audio output exists in the next audio output state storage 18. When it is determined in this step ST202 that the next audio output does not exist, the process is ended.

In contrast, when it is determined in above-mentioned step ST202 that the next audio output exists, it is then checked whether or not to output the next audio output (step ST203). More specifically, the output determiner 15 determines whether or not to output the next audio output acquired in step ST201 on the basis of the information acquired from the next audio output state determiner 19 and showing the determination result. The details of the process of this step ST203 will be mentioned below. When it is determined in step ST203 that the next audio output is outputted, the acquired audio output is played back (step ST204). More specifically, the output determiner 15 plays back the next audio output acquired in step ST201. The next audio outputs are then updated (step ST206). More specifically, the output determiner 15 updates the contents of the next audio output state storage 18. Concretely, an update message is sent from the output determiner 15 to the next audio output state storage 18, and the next audio output state storage 18 discards the next audio output stored therein (i.e., the audio output which is acquired in step ST201 and which is played back in step ST204).

When it is determined in above-mentioned step ST203 that the next audio output is not outputted, the audio output acquired is then discarded (step ST205). More specifically, the output determiner 15 discards the next audio output acquired in step ST201. After that, the navigation device advances to step ST206 and updates the next audio outputs. More specifically, the output determiner 15 updates the contents of the next audio output state storage 18. Concretely, an update message is sent from the output determiner 15 to the next audio output state storage 18, and the next audio output state storage 18 discards the next audio output stored therein (i.e., the audio output which is acquired in step ST201 and which is discarded in step ST205).

When the next audio output state storage 18 stores the next audio outputs in a form as shown in FIG. 3(*b*), only the newest next audio output is discarded and the other next audio outputs are raised.

Next, the details of the process performed in above-mentioned step ST203, i.e., the process performed by the next audio output state determiner 19 will be explained. The next audio output state determiner 19 receives the next audio output acquired in step ST201 of FIG. 5 from the output determiner 15, and compares the received next audio output with the current navigation information to determine whether or not to output the next audio output.

Figure 6:
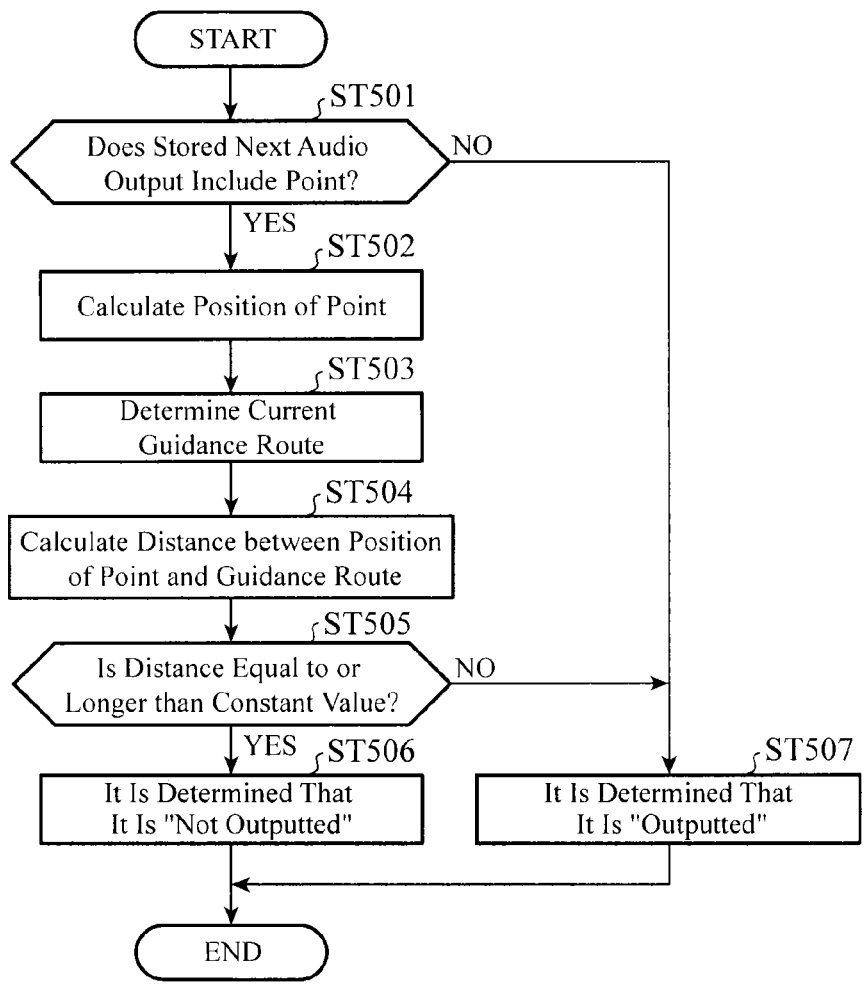
FIG. 6 is a flow chart showing a process of step ST203 which implements the second function of the output determiner of the navigation device in accordance with Embodiment 1 of the present invention.

An example of the process performed in step ST203 will be explained with reference to a flow chart shown in FIG. 6. Terms which will be used hereafter are defined as below. A term "stored" indicates information included in the next audio output which is stored in the next audio output state storage 18. Further, a term "current" indicates information included in the navigation information at the time when step ST203 is performed.

When the process is started, it is checked first whether the stored next audio output includes a point (step ST501). More specifically, the next audio output state determiner 19 checks the contents of the stored next audio output, and, when finding a word showing a location, such as "OOO intersection", determines that it is a point. When it is determined in this step ST501 that the stored next audio output does not include any point, it is determined that the stored next audio output is "outputted" (step ST507), and the process is ended.

In contrast, when it is determined in above-mentioned step ST501 that the stored next audio output includes a point, the position of the point is calculated (step ST502). More specifically, the next audio output state determiner 19 acquires the latitude and the longitude of the point from the map database 5. A current guidance route is then determined (step ST503). More specifically, in a case in which the navigation control unit 9 has a function of providing route guidance, the next audio output state determiner 19 acquires a guidance route for use in the function from the route determining unit 12. In a case in which the navigation control unit 9 does not have a function of providing route guidance, a straight line connecting between the current position and the destination (which is set up separately) can be defined as the guidance route.

The distance between the position of the point calculated in step ST502 and the guidance route determined in step ST503 is then calculated (step ST504). More specifically, the distance between the target point and the guidance route is calculated. In this case, straight lines each extending from the target point to a representative point of the guidance route (a start point, an end point, an intersection on the guidance route, or the like) are drawn, and the length of the shortest one of them can be used as the distance. As an alternative, the length of a perpendicular line which is dropped from the target point to the guidance route can be used as the distance.

It is then checked whether or not the distance calculated in step ST504 is equal to or longer than a constant value (step ST505). More specifically, the next audio output state determiner 19 compares the distance calculated in step ST504 with a threshold which is a predetermined distance. The threshold can be predetermined by the designer of the navigation device or a user. For example, the threshold is predetermined to be 50 m or one second for each of the latitude and the longitude. When it is determined in step ST505 that the distance is equal to or longer than the constant value, it is determined that the stored next audio output is "not outputted" (step ST506), and the process is ended.

In contrast, when it is determined in above-mentioned step ST505 that the distance is shorter than the constant value, the navigation device advances to above-mentioned step ST507, and determines that it "outputs" the stored next audio output and ends the process.

As previously explained, the navigation device in accordance with Embodiment 1 of the present invention manages audio information and guidance information by using the priority database 17 without discriminating between them, and determines information to be played back in consideration of the priorities. Further, by storing processes to be performed in order after one audio output is completed, even though three or more audio outputs coincide, the navigation device can play back the audio outputs in desired order. In addition, because the next audio output state determiner 19 determines whether or not to output a next audio output, the navigation device can prevent unnecessary audio output from being performed. As a result, there is provided an advantage of being able to prevent low-priority audio output from being performed in, for example, a situation in which the vehicle has passed through an intersection where the low-priority audio output is determined as guidance to be provided while high-priority audio output is performed.

Embodiment 2

In Embodiment 2, in addition to a next audio output, navigation information is stored in a next audio output state storage 18, and a next audio output state determiner 19 determines whether or not to output the next audio output by using this navigation information. Because a basic operation in accordance with Embodiment 2 is the same as that in accordance with Embodiment 1, a point different from Embodiment 1 will be mainly explained hereafter.

The structure of a navigation device in accordance with this Embodiment 2 is the same as that of the navigation device in accordance with Embodiment 1 shown in the block diagram of FIG. 1.

In the next audio output state storage 18, the type of information stored differs from that shown in Embodiment 1. More specifically, information which is stored in response to a request from an output determiner 15 is a next audio output and navigation information. In this embodiment, the navigation information includes information which the navigation device has, such as a time, a vehicle position, a guidance route, guidance points (a next intersection etc.), or a destination.

Figure 5:
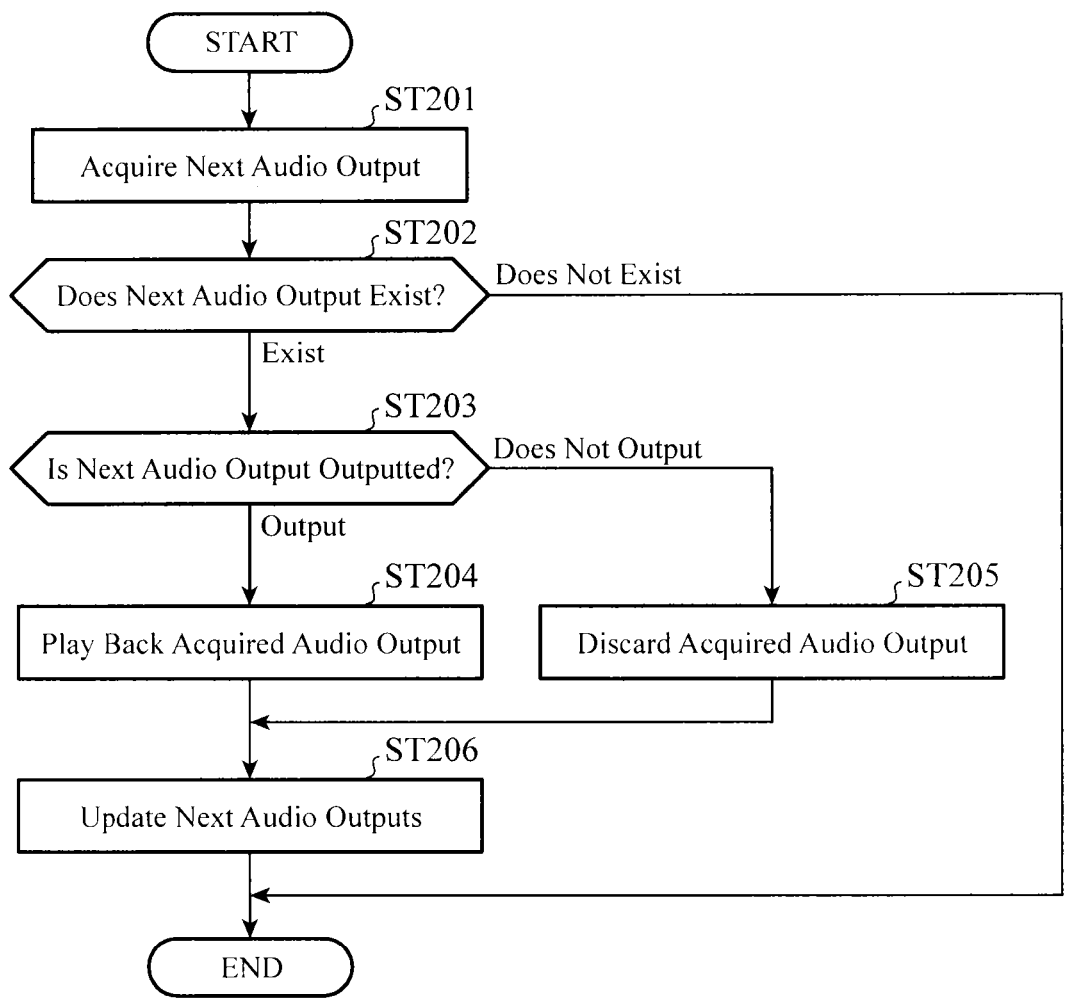
FIG. 5 is a flow chart showing a process which implements a second function of the output determiner of the navigation device in accordance with Embodiment 1 of the present invention.

The output determiner 15 differs from that in accordance with Embodiment 1 in (A): in a process shown in FIG. 4, when a next audio output is stored in the next audio output state storage 18, the navigation information is also stored, and (B): in a process shown in FIG. 5, when a next audio output is acquired from the next audio output state storage 18, the navigation information is also acquired.

More specifically, in the case of (A), when an audio output B is stored as a next audio output in step ST106 of FIG. 4, the navigation information is also stored in the next audio output state storage 18 together with the next audio output. In the case of (B), when a next audio output is acquired from the next audio output state storage 18 in step ST201 of FIG. 5, the navigation information stored together with the next audio output is also acquired.

The operation of a next audio output state determiner 19 and a process of step ST203 shown in the flow chart of FIG. 5 differ from those shown in Embodiment 1 in that the navigation information is used. Hereafter, an example of the process will be explained by using flow charts shown in FIGS. 7 to 10 instead of the flow chart shown in FIG. 6. Although each of processes shown in the flow charts of FIGS. 7 to 10 can be made to be independently the process of step ST203, a combination of two or more of the processes shown in the flow charts of FIGS. 7 to 10 can be made to be the process of step ST203.

Terms which will be used hereafter are defined as below. A term "stored" indicates information included in the next audio output and the navigation information which are stored in the next audio output state storage 18. A term "current" indicates information included in the navigation information at the time when step ST203 is performed.

Figure 7:
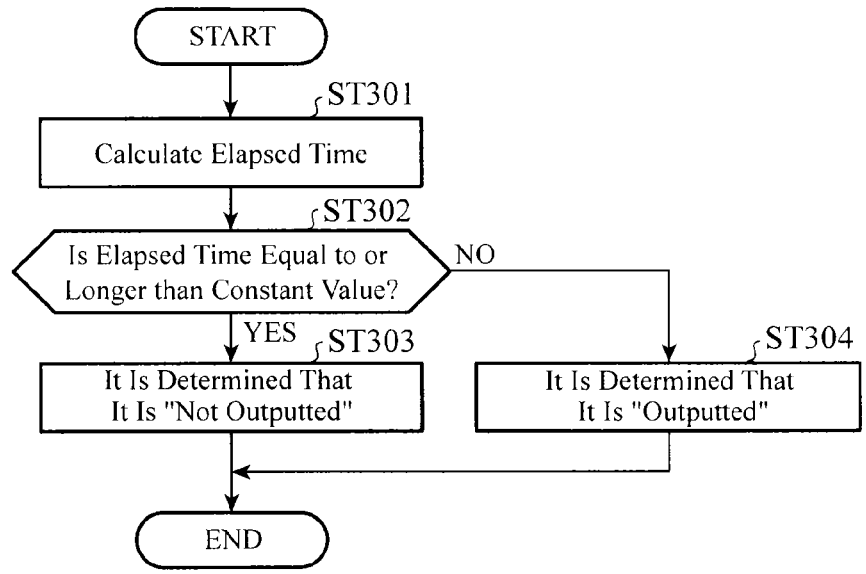
FIG. 7 is a flow chart showing a process of step ST203 which implements the second function of an output determiner of a navigation device in accordance with Embodiment 2 of the present invention.

FIG. 7 is a flow chart showing an example of the case of using a time as the navigation information. It is assumed that a time is acquired from a not shown time register. When the process is started, the elapsed time from the stored time to a current time is calculated (step ST301). More specifically, the next audio output state determiner 19 subtracts the time stored in the next audio output state storage 18 from the current time acquired from the time register to determine the difference, and defines this determined difference as the elapsed time. It is then checked whether or not the elapsed time calculated in step ST301 is equal to or longer than a constant value (step ST302). More specifically, the next audio output state determiner 19 compares the elapsed time calculated in step ST301 with a threshold which is a predetermined elapsed time. The threshold can be predetermined by the designer of the navigation device or a user. For example, the threshold is predetermined to be 100 seconds or 10 minutes. When it is determined in this step ST302 that the elapsed time calculated in step ST301 is equal to or longer than the constant value, it is determined that the stored next audio output is "not outputted" (step ST303), and the process is ended.

In contrast, when it is determined in the above-mentioned step ST302 that the elapsed time calculated in step ST301 is shorter than the constant value, it is determined that the stored next audio output is "outputted" (step ST304), and the process is ended.

Figure 8:
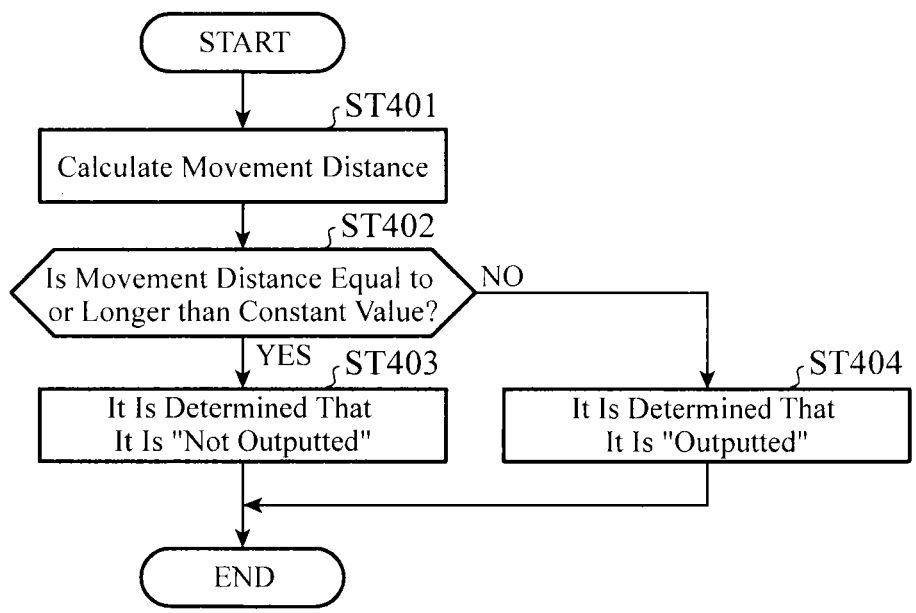
FIG. 8 is a flow chart showing the process of step ST203 which implements the second function of the output determiner of the navigation device in accordance with Embodiment 2 of the present invention.

FIG. 8 is a flow chart showing an example of using a vehicle position as the navigation information. When the process is started, the movement distance from the stored vehicle position to a current vehicle position is calculated first (step ST401). More specifically, the next audio output state determiner 19 subtracts the latitude and the longitude which are stored in the next audio output state storage 18 from the current latitude and longitude, respectively, to calculate the difference (slant distance), and defines this difference as the movement distance. In a case in which a navigation control unit 9 has a function of providing route guidance, a guidance route extending along roads leading from the stored vehicle position to the current vehicle position can be set up and the length of the guidance route can be defined as the movement distance. It is then checked whether the movement distance calculated in step ST401 is equal to or longer than a constant value (step ST402). More specifically, the next audio output state determiner 19 compares the movement distance calculated in step ST401 with a threshold which is a predetermined movement distance. The threshold can be predetermined by the designer of the navigation device or a user. For example, the threshold is predetermined to be 50 m or one second for each of the latitude and the longitude. When it is determined in this step ST402 that the movement distance calculated in step ST401 is equal to or longer than the constant value, it is determined that the stored next audio output is "not outputted" (step ST403), and the process is ended.

In contrast, when it is determined in above-mentioned step ST402 that the movement distance calculated in step ST401 is shorter than the constant value, it is determined that the stored next audio output is "outputted" (step ST404), and the process is ended.

Figure 9:
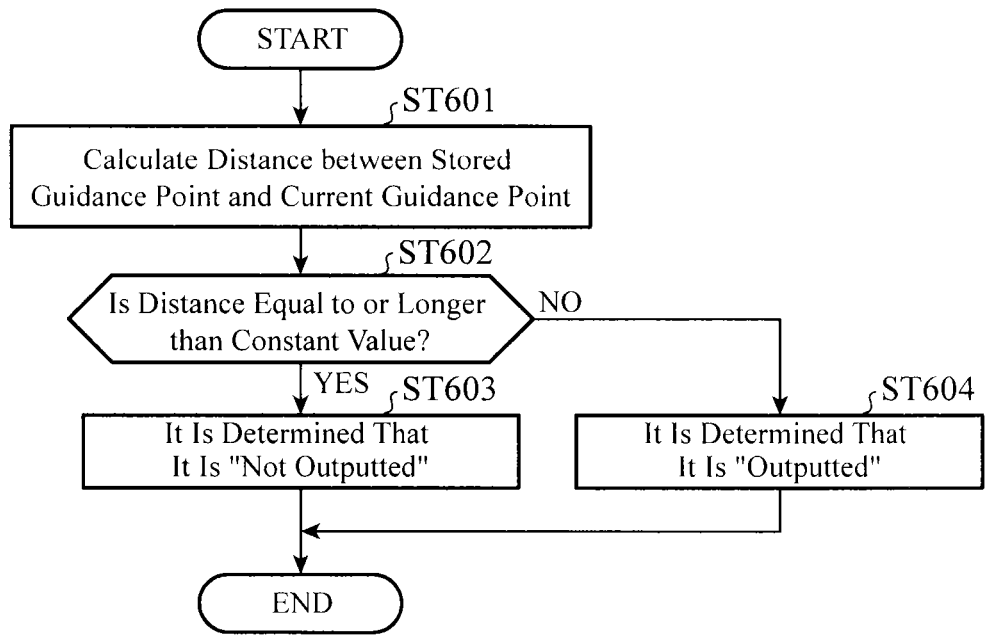
FIG. 9 is a flowchart showing the process of step ST203 which implements the second function of the output determiner of the navigation device in accordance with Embodiment 2 of the present invention.

FIG. 9 is a flow chart showing an example of using a guidance point as the navigation information. When the process is started, the distance between the stored guidance point and a current guidance point is calculated first (step ST601). More specifically, the next audio output state determiner 19 calculates the slant distance between the points by using the latitudes and longitudes of the two points, and defines the slant distance as the distance. In the case in which the navigation control unit 9 has a function of providing route guidance, a guidance route extending along roads leading from the stored vehicle position to the current vehicle position can be set up and the length of the guidance route can be defined as the distance. It is then checked to see whether the distance calculated in step ST601 is equal to or longer than a constant value (step ST602). More specifically, the next audio output state determiner 19 compares the distance calculated in step ST601 with a threshold which is a predetermined distance. The threshold can be predetermined by the designer of the navigation device or a user. For example, the threshold is predetermined to be 50 m or one second for each of the latitude and the longitude. When it is determined in this step ST602 that the distance calculated in step ST601 is equal to or longer than the constant value, it is determined that the stored next audio output is "not outputted" (step ST603), and the process is ended.

In contrast, when it is determined in above-mentioned step ST602 that the distance calculated in step ST601 is shorter than the constant value, it is determined that the stored next audio output is "outputted" (step ST604), and the process is ended. Although the navigation device uses a guidance point as the navigation information in the above-mentioned example, the navigation device can be alternatively structured in such a way as to use a guidance point or a destination as the navigation information.

Figure 10:
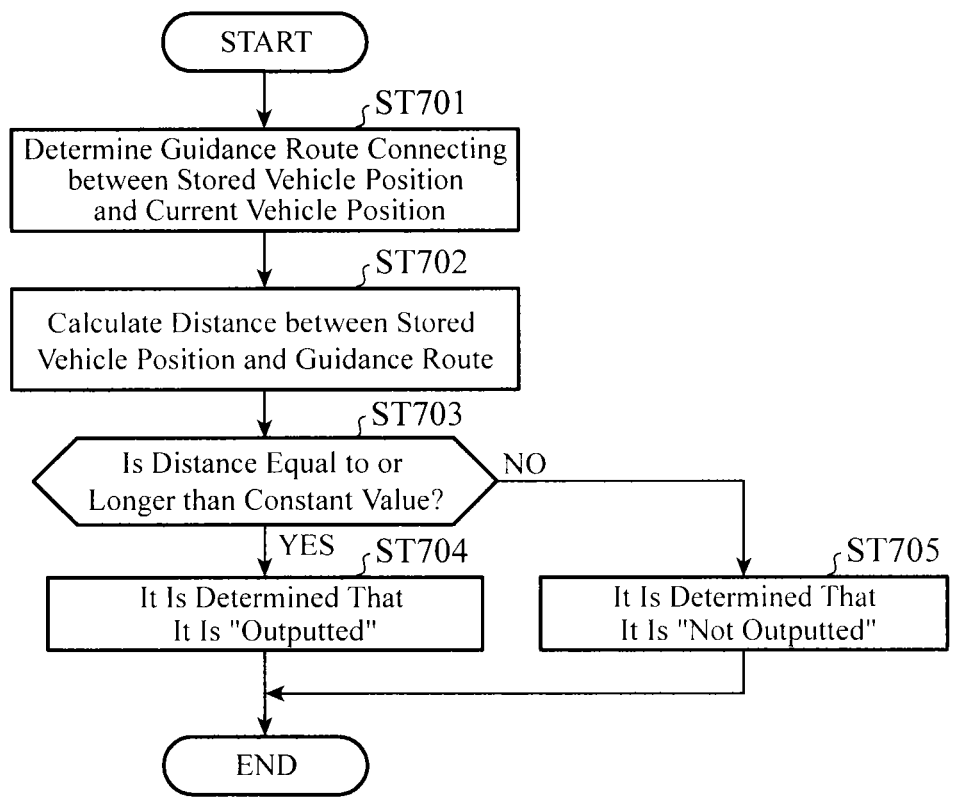
FIG. 10 is a flow chart showing the process of step ST203 which implements the second function of the output determiner of the navigation device in accordance with Embodiment 2 of the present invention.

FIG. 10 is a flow chart showing another example of using a vehicle position as the navigation information. When the process is started, a guidance route connecting between the stored vehicle position and the current vehicle position is determined first (step ST701). More specifically, in the case in which the navigation control unit 9 has a function of providing route guidance, the next audio output state determiner 19 sets up a guidance route extending along roads leading from the stored vehicle position to the current vehicle position by using the function. In the case in which the navigation control unit does not have a function of providing route guidance, a straight line connecting between the current position and the destination (which is set up separately) can be defined as a guidance route. The distance between the stored vehicle position and the guidance route is then calculated (step ST702). More specifically, the next audio output state determiner 19 calculates the distance between the vehicle position stored in the next audio output state storage 18 and the guidance route determined in step ST701. In this case, straight lines each extending from the stored vehicle position to a representative point of the guidance route determined in step ST701 (a start point, an end point, an intersection on the guidance route, or the like) are drawn, and the length of the shortest one of them can be used as the distance. As an alternative, the length of a perpendicular line which is dropped from the stored vehicle position to the guidance route determined in step ST701 can be used as the distance. It is then checked whether the distance calculated in step ST702 is equal to or longer than a constant value (step ST703). More specifically, the next audio output state determiner 19 compares the distance calculated in step ST702 with a threshold which is a predetermined distance. The threshold can be predetermined by the designer of the navigation device or a user. For example, the threshold is predetermined to be 50 m or one second for each of the latitude and the longitude. When it is determined in step ST703 that the distance is equal to or longer than the threshold, it is determined that the stored next audio output is "outputted" (step ST704), and the process is ended.

In contrast, when it is determined in above-mentioned step ST703 that the distance is shorter than the threshold, it is determined that the stored next audio output is "not outputted" (step ST705), and the process is ended.

As previously explained, the navigation device in accordance with Embodiment 2 of the present invention manages audio information and guidance information by using the priority database 17 without discriminating between them, and determines information to be played back in consideration of the priorities. Further, by storing processes to be performed in order after one audio output is completed, even though three or more audio outputs coincide, the navigation device can play back the audio outputs in desired order. In addition, because the next audio output state storage 18 is made to store the navigation information together with a next audio output, and the next audio output state determiner 19 also uses the stored navigation information as a determination criterion when determining whether or not to output the next audio output, the navigation device can prevent an unnecessary audio output from being outputted more correctly.

Although in Embodiments 1 and 2 it is determined in step ST109 of FIG. 4 whether or not to store a low-priority audio output in the next audio output state storage 18, all low-priority audio outputs can be stored in the next audio output state storage 18 without performing this process.

While the invention has been described in its preferred embodiments, it is to be understood that various changes can be made in an arbitrary component in accordance with any one of the embodiments, and an arbitrary component in accordance with anyone of the embodiments can be omitted within the scope of the invention.

INDUSTRIAL APPLICABILITY

Because the navigation device in accordance with the present invention can manages the priority of each audio output and control the playback of the audio output even though a plurality of audio outputs coincide, the navigation device is suitable for use in a navigation system that outputs two or more types of sounds, such as a car navigation system.

EXPLANATIONS OF REFERENCE NUMERALS

1 GPS receiver, 2 speed sensor, 3 heading sensor, 4 vehicle position heading calculator, 5 map database, 6 input operation unit, 7 musical piece information database, 9 navigation control unit, 10 output unit, 11 destination setting unit, 12 route determining unit, 13 guidance information playback unit, 14 audio playback unit, 15 output determiner, 16 priority holding unit, 17 priority database, 18 next audio output state storage, 19 next audio output state determiner.

The invention claimed is:
1. A navigation device comprising:
a next audio output state storage that stores, as a next audio output, an audio output which is to be started next time when one audio output is completed;
a priority database that holds priorities between said audio outputs and information showing whether or not to store said audio output having a lower one of said priorities in said next audio output state storage;

a priority holder that acquires and manages said priorities of said audio outputs from said priority database;

a next audio output state determiner that determines whether or not to output said next audio output stored in said next audio output state storage on a basis of both a storing state of said next audio output in said next audio output state storage, and current navigation information; and an output determiner that, when a plurality of playback requests each for playback of said audio output coincide, outputs said audio output having a highest one of said priorities acquired from said priority holder, and stores said audio output having a lower one of said priorities other than said audio output having the highest one of said priorities in said next audio output state storage as said next audio output, and that determines said audio output to be played back according to the determination by said next audio output state determiner when said one audio output is completed.

2. The navigation device according to claim 1, wherein the priorities between audio outputs which are held by the priority database include at least one of giving a higher priority to an old audio output, giving a higher priority to a new audio output, a same priority, or giving a higher priority to an audio output having a short audio playback duration.

3. The navigation device according to claim 1, wherein the next audio output state storage stores navigation information in addition to the next audio output, and the next audio output state determiner compares the navigation information stored in said next audio output state storage with the current navigation information to determine whether or not to output the audio output stored in said next audio output state storage.

4. The navigation device according to claim 2, wherein the next audio output state storage stores navigation information in addition to the next audio output, and the next audio output state determiner compares the navigation information stored in said next audio output state storage with the current navigation information to determine whether or not to output the audio output stored in said next audio output state storage.

5. The navigation device according to claim 3, wherein the next audio output state storage stores, as the navigation information, a time when this navigation information is stored, and the next audio output state determiner determines whether or not to output the audio output stored in said next audio output state storage according to an elapsed time which is a difference between the time stored in said next audio output state storage and a current time.

6. The navigation device according to claim 3, wherein the next audio output state storage stores, as the navigation information, a vehicle position at a time when this navigation information is stored, and the next audio output state determiner determines whether or not to output the audio output stored in said next audio output state storage according to a movement distance which is a difference between the vehicle position stored in said next audio output state storage and a current vehicle position.

7. The navigation device according to claim 3, wherein the next audio output state storage stores, as the navigation information, a guidance point or a destination at a time when this navigation information is stored, and the next audio output state determiner determines whether or not to output the audio output stored in said next audio output state storage according to a distance from the guidance point or the destination stored in said next audio output state storage to a current guidance point.

8. The navigation device according to claim 3, wherein the next audio output state storage stores, as the navigation information, a vehicle position at a time when this navigation information is stored, and the next audio output state determiner determines whether or not to output the audio output stored in said next audio output state storage according to both a guidance route connecting between the vehicle position stored in said next audio output state storage and a current vehicle position, and a distance which is a difference of the vehicle position stored in said next audio output state storage.

* * * * *